United States Patent [19]
Nakano et al.

[11] Patent Number: 5,660,863
[45] Date of Patent: Aug. 26, 1997

[54] APPARATUS FOR PRODUCTION OF CERAMICS REINFORCED WITH THREE-DIMENSIONAL FIBERS

[75] Inventors: Kikuo Nakano, Kasugai; Akira Kamiya, Nishi-ku, both of Japan

[73] Assignee: Agency of Industrial Science & Technology, Ministry of International Trade & Industry, Tokyo, Japan

[21] Appl. No.: 767,413

[22] Filed: Dec. 16, 1996

Related U.S. Application Data

[60] Continuation of Ser. No. 531,182, Sep. 19, 1995, abandoned, which is a division of Ser. No. 205,405, Mar. 3, 1994, Pat. No. 5,489,408.

[30] Foreign Application Priority Data

Mar. 8, 1993 [JP] Japan .................. 5-075270
May 11, 1993 [JP] Japan .................. 5-133852

[51] Int. Cl.$^6$ .................................................. B29C 43/36
[52] U.S. Cl. .................. 425/85; 425/420; 425/812
[58] Field of Search .................. 264/86; 425/84, 425/85, 420, 812

[56] References Cited

U.S. PATENT DOCUMENTS

| | | | |
|---|---|---|---|
| 1,823,180 | 9/1931 | White et al. | 425/812 |
| 1,826,945 | 10/1931 | McKay et al. | 425/420 |
| 3,183,570 | 5/1965 | Vogt | 425/420 |
| 3,838,001 | 9/1974 | Greiner et al. | 425/84 |
| 4,162,877 | 7/1979 | Nyberg | 425/84 |
| 4,335,065 | 6/1982 | Ando | 425/85 |
| 4,568,594 | 2/1986 | Hordonneau et al. | 428/113 |
| 4,753,713 | 6/1988 | Gunderson | 425/84 |
| 4,775,705 | 10/1988 | Parker et al. | 264/87 |
| 4,853,087 | 8/1989 | Schlor et al. | 425/84 |
| 5,156,856 | 10/1992 | Iwasaki et al. | 425/85 |
| 5,198,167 | 3/1993 | Ohta et al. | 425/84 |
| 5,468,135 | 11/1995 | Thomas | 425/85 |

FOREIGN PATENT DOCUMENTS

| | | | |
|---|---|---|---|
| 10784 | 2/1934 | Australia | 425/84 |
| 587160 | 3/1994 | European Pat. Off. | 425/84 |
| 145897 | 1/1981 | Germany | 425/84 |
| 2-308822 | 12/1990 | Japan | 264/86 |

OTHER PUBLICATIONS

Ceramic Bulletin, vol. 65, No. 5, pp. 305–313, K. M. Prewo, et al., "Fiber Reinforced Glasses and Glass–Ceramics for High Performance Applications" 1986.

*Primary Examiner*—Robert Davis
*Attorney, Agent, or Firm*—Oblon, Spivak, McClelland, Maier & Neustadt, P.C.

[57] ABSTRACT

An apparatus for the production of three-dimensional fiber-reinforced ceramics, which apparatus contains a foundation open at an upper end thereof and enclosing an empty space and a cylinder disposed on the foundation, the empty space of the foundation and an open space of the cylinder integrally forming a continuous empty space, and the continuous empty space having an empty region at a lowermost portion thereof having a filter plate set fast therein and having a pressure piston set fast above said filter plate to form between the pressure piston and the filter plate an empty region for accommodating a slurry for the production of the three-dimensional fiber-reinforced ceramics;

wherein the filter plate contains a porous sintered metallic plate and a filter paper having holes not more than 0.3 μm in diameter formed therein for precluding passage therethrough of a filler powder contained in the slurry and allowing exclusive passage therethrough of a solvent component thereof; and wherein the piston is sealed around a periphery thereof in order to preclude loss of the slurry through a gap between the periphery of the piston and an inner surface of the cylinder.

8 Claims, 1 Drawing Sheet

APPARATUS FOR PRODUCTION OF CERAMICS REINFORCED WITH THREE-DIMENSIONAL FIBERS

This application is a Continuation of application Ser. No. 08/531,182, filed on Sep. 19,1995, now abandoned; which was a division of Ser. No. 08/205,405, filed Mar. 3,1994, now U.S. Pat. No. 5,489,408.

BACKGROUND OF THE INVENTION

FIELD OF THE INVENTION

This invention relates to a method for the production of ceramics reinforced with three-dimensional fibers and an apparatus for the production of the ceramics.

PRIOR ART STATEMENT

Ceramics reinforced with fibers have recently been attracting attention as products improved by elimination of such drawbacks as low toughness and poor reliability of strength which are monolithic ceramics. Three kinds of fiber reinforcing type are known: one-dimensional reinforcement in which fibers are laid out only in one direction, two-dimensional reinforcement in which fibers are laid out in two directions (in a plane), and three-dimensional reinforcement in which fibers are laid out in three directions (in a cubic pattern). These kinds of fiber reinforcement manifest the following characteristics.

The one-dimensional fiber reinforcing type manifest tensile and flexural strength sufficiently in the direction of the fibers but only meagerly in directions at or near perpendicular to the direction of the fiber reinforcement. The two-dimensional fiber reinforcing type exhibits great strength in the plane containing the fibers but poor strength in the direction perpendicular to the plane. They also tend to induce peeling. In contrast, the three-dimensional fiber reinforcing type shows strength virtually uniformly in an isotropic manner in all directions. The three-dimensional fiber reinforcing type is therefore ideal for the purpose of reinforcement.

While fiber-reinforced ceramics using one-dimensional and two-dimensional fiber reinforcements can be manufactured rather easily, those using three-dimensional fibers cannot.

Basically, the ceramics reinforced with three-dimensional fibers (hereinafter referred to as "three-dimensional fiber-reinforced ceramics") have a construction comprising a three-dimensionally formed fibrous web (preform) and a ceramic mass filling the interstices between the component fibers of the fibrous web to give rise to a matrix. Since the three-dimensional fibrous preform, unlike the one-dimensional and two-dimensional fibrous preforms, has component fibers densely and cubically interwoven, the individual fibers thereof strongly contact one another and form narrow interstices and not all of the gaps between the adjacent fibers are interconnected. Thus, the three-dimensional fibrous preform is not easily filled with a matrix substance.

The filling of the three-dimensional fibrous preform with the matrix substance is generally effected by mixing the matrix substance with such additives as an organic binding agent to form a liquid substance, injecting this liquid substance into a preform, and then firing the resultant composite. In this case, the organic binding agent and other additives contained in the liquid substance filling the preform induce thermal decomposition and the like and, as illustrated in FIG. 1, give rise to many pores 4 in a matrix part 3. For the purpose of producing ceramics which are reinforced with densely interwoven three-dimensional fibers, therefore, it is necessary that the number of such pores in the composite should be decreased to the fullest possible extent.

This invention has for its object the provision of an improved method for the production of ceramics reinforced with three-dimensional fibers and an apparatus for working this method.

SUMMARY OF THE INVENTION

To accomplish the object described above, this invention provides a method for the production of ceramics reinforced with three-dimensional fibers, which method comprises setting a filter plate on one surface of a three-dimensional fibrous preform, superposing on the surface of the three-dimensional fibrous preform opposite to the surface thereof covered by the filter sheet a slurry consisting of a fine ceramic powder, a precursory substance of the ceramic mentioned above, and a solvent, exerting high pressure on the slurry and reducing the pressure on the filter sheet side for causing the slurry to permeate the three-dimensional fibrous preform and enabling the solvent in the slurry to penetrate the filter sheet and pass to the exterior thereof through aspiration, consequently obtaining a composite having the preform filled with the fine ceramic powder and the finely divided precursory substance, heating the composite for thermally decomposing the precursory substance, and thereafter firing the resultant composite. The invention also provides an apparatus for the production of three-dimensional fiber-reinforced ceramics, which apparatus comprises a foundation open on its upper side and enclosing an empty space and a cylinder disposed on the foundation, the empty space of the foundation and the open space of the cylinder integrally forming a continuous empty space, and the continuous empty space having an empty region at the lowermost part thereof for allowing a filter plate to be set fast therein and permitting a pressure piston to be set fast above the filter plate to form between the pressure piston and the filter plate an empty region for accommodating a slurry for the production of three-dimensional fiber-reinforced ceramics.

The method mentioned above embraces the case of using a slurry which further comprises an amorphous ceramic powder obtained by thermally decomposing the precursory substance of the ceramic.

DESCRIPTION OF THE PREFERRED EMBODIMENTS

As a fine ceramic powder using SiC, a fine β-SiC powder (having a particle diameter of 0.3 μm, for example) proves ideal. $Si_3N_4$ is also useful.

The fine powder under discussion generally is desired to have a particle diameter in the range of 0.01 to 3 μm. If the particle diameter is less than 0.01 μm, the individual particles of the powder undergo conspicuous agglomeration. If the particle diameter exceeds 3 μm, the powder cannot easily enter into the interstices between the adjacent fibers. The fine powder may contain therein not more than 10% by weight of sintering and dispersing auxiliaries.

The solvent to be used in the slurry is not particularly restricted. Practically, toluene and xylene are advantageously usable herein.

The solvent may contain an organic binding agent. As concrete examples of organic binding agents advantageously usable herein, polyvinyl alcohol and hydrocarbon type waxes may be cited. The upper limit of the content of the organic binding agent in the solvent is 10% by weight.

As concrete examples of precursory substances favorably usable herein, polycarbosilane and polysilastyrene, which are suitable for ceramics of SiC, and polysilazine and polyhydrosilazine, which are suitable for ceramics of $Si_3N_4$, may be cited.

Figure 1:
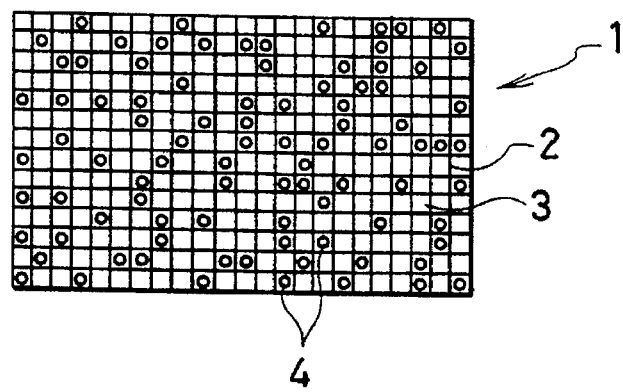
FIG. 1 is a diagram illustrating the occurrence of pores in a ceramic produced by filling the interstices of a three-dimensional fibrous preform with a matrix substance.

In the firing step of process of manufacturing a ceramic composite, the organic binding agent and the precursory substance in the slurry thermally decompose and give off volatile components. Pores develop in the matrix part of the composite material (FIG. 1) unless the volatile components are removed to the fullest possible extent. For the purpose of repressing the occurrence of such pores and ensuring production of a highly densified composite material, therefore, it is necessary to reduce the amount of the organic binding agent and the precursory substance in the slurry to the minimum required.

One of the main roles of the organic binding agent and the precursory substance used in the present invention resides in enabling the slurry to permeate the three dimensional fibrous preform, thereby increasing the interfacial strength between the fibers and the filling substances in a formed green article manufactured in a dry state, and facilitating the subsequent processes. The product of decomposition of the precursory substance serves as a sintering auxiliary. The slurry substantially consists of the ceramic powder, the organic silicon resin as a precursory substance, and the solvent.

The ceramic powder content of the slurry is in the range of 70 to 90% by weight and the organic silicon resin content thereof is in the range of 30 to 10% by weight. The slurry concentration is in the range of 100 to 200 g/liter. These proportions are factors to be determined empirically. The precursory substance generally undergoes thermal decomposition in the process of firing and consequently converts to ceramic. The proportion of this precursory substance which yields to this conversion is about 70% at most.

The slurry, by exertion of high pressure thereon, is caused to permeate the fibrous preform which is obtained by three-dimensionally interweaving carbon fibers, silicon nitride fibers, or glass fibers. Simultaneously with the injection of the slurry, the three-dimensional fibrous preform is subjected to vacuum aspiration through a paper filter and a sintered porous metallic plate which are superposed on the opposite side of the preform so as to curb passage therethrough of the ceramic powder, organic binding agent, and precursory substance and allow positive passage of the solvent part therefrom.

The method just mentioned is aimed at purging the solvent part from the three-dimensional fibrous preform while minimizing discharge of the other parts therefrom. Actually, in the case of the slurry answering the description given above, a fair amount, specifically about 40 to 50% by weight, of the other parts are discharged from the preform. It is important from the practical point of view to decrease the amount of this discharge.

The substances which are produced by the decomposition of the fine ceramic powder contained in the slurry and the precursory substance incorporated in advance in the slurry are invariably crystalline morphologically. The portion of the precursory substance which is discharged from the preform in combination with the solvent part can be compensated for by using a slurry which additionally incorporates therein an amorphous ceramic substance (obtained by the decomposition of the precursory substance of the ceramic prior to the addition of the slurry).

The amount of the amorphous ceramic substance to be added for the purpose just mentioned is only required to be such as to replace 5 to 10% of the fine ceramic powder already existing in the slurry. Since this substance serves as a sintering material, excessive addition thereof is undesirable.

When the matrix substance remaining after the discharge of the solvent, namely the three-dimensional fibrous preform impregnated with the fine ceramic powder, the precursory substance, and an amorphous ceramic substance obtained by the thermal decomposition of the precursory substance, is heated, the precursory substance undergoes thermal decomposition. A three-dimensional fiber-reinforced ceramic is obtained by sintering the product of this thermal decomposition. The temperature of the thermal decomposition is in the range of 600° to 1,000° C. and the temperature of the sintering in the range of 1,500° to 2,000° C.

Figure 2:
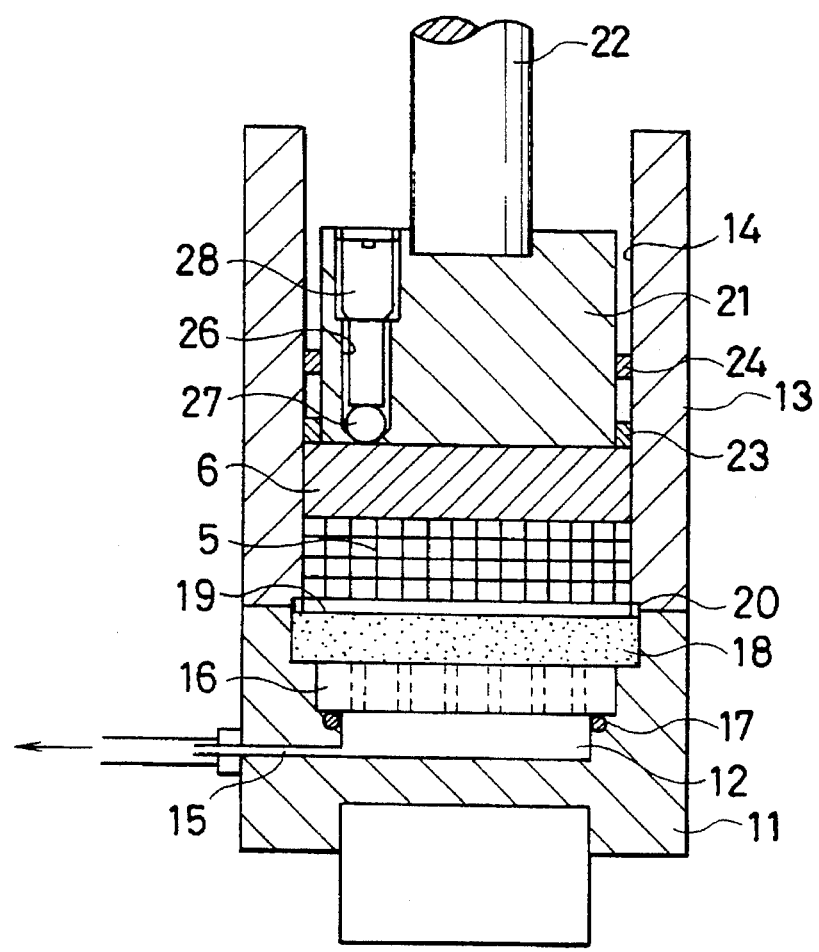
FIG. 2 is a diagram illustrating an apparatus to be used for the production of three-dimensional fiber-reinforced ceramic material.

FIG. 2 is a schematic diagram of an apparatus according to this invention to be used for filling the interstices between the component fibers of a three-dimensional fibrous preform.

This apparatus is provided with a foundation 11 having an aspiration chamber 12 formed therein by depression and a cylinder 13 set in place on the foundation 11 and provided with a cylinder hole 14 communicating with the aspiration chamber 12. The foundation 11 is so adapted that the aspiration chamber 12 communicates with a vacuum pump through an aspiration path 15. A porous stainless steel bottom plate 16 is mounted on the aspiration chamber 12 through the medium of an O-ring 17. A porous sintered metallic plate (Porouston) 18 is mounted on the bottom plate 16. A paper filter 19 is laid on the sintered metallic plate 18. An O-ring 20 is interposed between the paper filter 19 and the cylinder 13 for preventing leakage of high pressure slurry (to be described later) from the periphery of the paper filter 19.

The cylinder hole 14 includes an empty space for accommodating a three-dimensional fibrous preform 5 and a slurry 6 on top of the paper filter 19. A piston 21 is set in place over this empty space. The piston 21 is actuated by a ram 22 of a pressing device (not shown). An O-ring 23 and as many piston rings 24 of Teflon (trademark) as are required are set in place around the periphery of the piston 21 so as to preclude otherwise possible leakage of the slurry 6 through the gap between the periphery of the piston 21 and the inner surface of the cylinder 13.

When the space accommodating the three-dimensional fibrous preform 5 and the slurry 6 is closed on the upper side thereof with the piston 21, air is entrapped in the empty space overlying the slurry 6. For the purpose of discharging this entrapped air, an air vent 26 is bored through the piston 21 and a spherical steel plug 27 for closing the air vent 26 is inserted in the inner terminal of the air vent 26 and kept in a closed state by means of a feed screw 28 which is screwed into the air vent 26.

The stainless steel bottom plate 16 mentioned above is formed with a large number of holes measuring approximately 1 mm in diameter. The paper filter 19 has pores not more than 0.3 μm in diameter formed therein for the purpose of precluding passage therethrough of a filler powder (generally not more than 1 μm in diameter) contained in the slurry 6 and allowing exclusive passage therethrough of the solvent component.

It has been experimentally established that in the apparatus of this invention constructed as described above, the slurry 6 held inside the cylinder hole 14 does not ooze out even under as large a pressure as 400 kgf/cm$^2$ exerted on the piston 31. For the purpose of enabling the fine powder, organic binding agent, and precursory substance contained in the slurry 6 to be packed uniformly at a high density in the fibrous preform 5, the pressing speed of the pressing device can be freely set in the range of 0.05 to 5 mm/min. The pressing device is desired to be capable of accurately controlling this pressing speed (within 5 mm/min±0.2% in the case of uniform speed control and in the range of 1.00 to 20.00 ton force±1% in the case of fixed load control).

Preparatory to the production of the three-dimensional fiber-reinforced composite material by the use of the apparatus for production constructed as described above, the bottom plate 16, the sintered plate 18, and the paper filter 19 are set in place inside the cylinder hole 14, the fibrous preform 5 is placed thereon, and the slurry 6 or the liquid matrix substance is placed thereon in an amount greater than the bulk volume of the fibrous preform 5. Then, the spherical feed screw 28 of steel in the piston 21 is loosened to open the spherical steel plug 27, the entrapped air on the surface of the slurry 6 is discharged, the spherical steel plug 27 is closed, the piston 21 is lowered to depress the slurry 6 downwardly, and the interior of the aspiration chamber 12 is aspirated from below by means of a vacuum pump. As a result, the slurry 6 is packed densely in the interstices between the individual fibers of the fibrous preform 5.

In this case, since the O-ring 23 and as many piston rings 24 as necessary are set in place around the periphery of the piston 21, the slurry 6 does not ooze out through the gap between the periphery of the piston 21 and the inner surface of the cylinder 13 even when the piston 21 is lowered at a high pressure. Moreover, in the bottom part of the cylinder hole 14, the otherwise possible leakage of the slurry of high pressure is precluded because the O-rings 20, 17 are set in place respectively above the paper filter 19 and below the bottom plate 16. The paper filter 19 fulfills the function of obstructing passage therethrough of the filler powder in the slurry and permitting exclusive passage therethrough of the solvent part of the slurry. The solvent part passing through the paper filter 19 is discharged into the aspiration chamber 12 via the holes in the porous sintered metallic plate 18 and the bottom plate 16 which both underlie the paper filter 19.

The combination of the pressure exerted by the piston and the aspiration caused by the vacuum pump brings about the following benefits.

1. During the pressing operation which is effected by placing the fibrous preform 5 and the slurry 6 in the cylinder 13 and subsequently inserting the piston 21 into the cylinder 13, the air entrapped in the fibrous preform 5 and between the upper surface of the slurry 6 and the piston 21 is easily aspirated by the operation of the vacuum pump and, as a result, the matrix can be packed with high density.
2. Prior to the pressing operation, the slurry 6 placed in the cylinder 13 is in a state of low viscosity (because of low concentration of the organic binding agent or the precursory substance in the liquid medium) and therefore can easily enter the gaps in the fibrous preform 5. Between the pressing-aspirating operations produced by the apparatus of FIG. 2, the aspirating operation permits particularly copious separation of the solvent part in the slurry 6 and, as a result, the solute (the organic binding agent or precursory substance) of high concentration can be packed together with the ceramic powder in the gaps of the fibrous preform 5.

This effect can be adjusted by suitably choosing the diameter of the pores formed in the paper filter 19 disposed in the bottom part of the cylinder 13 of FIG. 2. Generally, when the paper filter has pores of a small diameter (such as, for example, 0.3 to 0.1 μm), the solute part can be retained in a fairly large amount in the slurry.

3. The combination of the pressing operation with the aspirating operation curtails the time required for the removal of the solvent from the slurry.

Now, concrete examples of the method for the production of a composite material according with this invention will be described below.

Three-dimensional fiber-reinforced ceramic were produced by the method of this invention using the apparatus of this invention constructed as illustrated in FIG. 2.

EXAMPLE 1

As a three-dimensional fiber preform, a section 45 mm×60 mm cut from a fibrous mass (fiber content 54%) obtained by perpendicularly interweaving carbon fibers in the form of a flat plate 6 mm in thickness was used.

A slurry to be injected into this three-dimensional fibrous preform was prepared by combining 80 g of a fine SiC powder (average particle diameter 0.3 μm) with 20 g of polysilastyrene as a precursory substance, adding 5 g of an aluminum boride powder to the resultant blend, and thoroughly mixing the blend with 100 g of toluene added thereto as an organic solvent.

The three-dimensional fibrous preform of carbon fibers and the slurry were placed in the cylinder, pressed to a maximum pressure of 24 MPa by lowering the piston at a pressing speed of 0.05 mm/min, and left standing under this pressure for 1.5 hours to produce a formed mass of a fiber-ceramic precursor composite.

Then, the formed mass of composite was heated in an atmosphere of argon at 700° C. to effect thermal decomposition of the precursory substance and fired in an atmosphere of argon at 2,000° C. for about one hour to give birth to a three-dimensional fiber-reinforced SiC composite material having a very small pore content (15% in porosity).

EXAMPLE 2

A concrete example of the method of this invention for the production of a composite material will now be described.

In an atmosphere of $N_2$, 23.1 g of polysilazane as a precursory substance was thermally decomposed by heating to 850° C. and pulverized to obtain a fine amorphous powder of $Si_3N_4$. Then, a slurry was prepared by placing 15 g of this fine powder, 80 g of an $\alpha$-$Si_3N_4$ powder (containing $Al_2O_3$ and $Y_2O_3$ as sintering auxiliaries), and 7 g of polysilazane in toluene and thoroughly mixing the resultant blend with a ball mill mixer. This slurry was placed together with a plate-shaped three-dimensional fibrous preform (having a fiber content of 54% and measuring 45 mm×60 mm×6 mm thick) obtained by interweaving carbon fibers in the cylinder of the apparatus for the production of a composite material illustrated in FIG. 1 and pressed in the cylinder to a pressure of 30 MPa to effect impregnation of the preform with the slurry. As a result, a fiber/matrix composite green body was produced.

Thereafter, the body was heated at 850° C. in an atmosphere of $N_2$ to effect thermal decomposition of the polysilazane and further sintered in the same atmosphere at 1,650° C. to produce a composite material. The bulk density of this composite material was 1.55 g/cm². The matrix was found to comprise $\beta Si_3N_4$ as the main phase and a small amount of $\alpha$-$Si_3N_4$ phase.

When the matrix substance was packed in the gaps of the three-dimensional fibrous preform by the process described above, the substance other than the solvent could be precluded from passing through the paper filter to a high degree.

What is claimed is:

1. An apparatus for the production of three-dimensional fiber-reinforced ceramics, which apparatus comprises a foundation open at an upper end thereof and enclosing an empty space and a cylinder disposed on said foundation, said empty space of said foundation and an open space of said cylinder integrally forming a continuous empty space, and said continuous empty space having an empty region at a lowermost portion thereof having filter means set fast therein and having a pressure piston set fast above said filter means to form between the pressure piston and the filter means an empty region for accommodating a slurry for the production of the three-dimensional fiber-reinforced ceramics;

wherein said filter means comprises a porous stainless steel bottom plate formed with a large number of holes measuring approximately 1 mm in diameter, a porous sintered metallic plate mounted on said bottom plate, and a paper filter having pores not more than 0.3 μm in diameter and disposed on said porous sintered metallic plate in order to preclude passage therethrough of a filler power contained in the slurry and allow exclusive passage therethrough of a solvent component; and wherein said piston has sealing means placed around a periphery thereof in order to preclude loss of said slurry through a gap between said periphery of said piston and an inner surface of said cylinder, and has an air vent provided with a spherical steel plug inserted at a bottom thereof by means of a screw for keeping said air vent in a closed state.

2. The apparatus of claim 1, wherein said lower empty region of said continuous empty space has pressure reducing means fixed therein.

3. The apparatus of claim 1, wherein said sealing means is selected from the group consisting of O-rings and piston rings.

4. The apparatus of claim 1, wherein said paper filter has holes of about 0.1 to 0.3 μm in diameter.

5. The apparatus of claim 1, which further comprises a vacuum pumping means in communication with said enclosed empty space by an aspiration path.

6. The apparatus of claim 1, which further comprises a ram of a pressing device, which actuates said piston.

7. The apparatus of claim 6, wherein said pressing device controls pressing speed to within 5 mm/min.±0.2% for uniform speed control.

8. The apparatus of claim 6, wherein said pressing device controls pressing speed to within a range of 1.00 to 20.00 ton force±1% for fixed load control.

* * * * *